US009403459B2

(12) United States Patent
Kondo et al.

(10) Patent No.: US 9,403,459 B2
(45) Date of Patent: Aug. 2, 2016

(54) SUPPORTING UNIT STRUCTURE OF VEHICLE SEAT

(71) Applicant: HONDA MOTOR CO., LTD., Minato-Ku, Tokyo (JP)

(72) Inventors: Takashi Kondo, Haga-Gun (JP); Shinobu Sato, Shioya-Gun (JP); Naoyuki Saruwatari, Haga-Gun (JP); Hiroyuki Yasuda, Haga-Gun (JP); Tomoyuki Honda, Haga-Gun (JP); Tomomi Kitsugi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/403,700

(22) PCT Filed: May 13, 2013

(86) PCT No.: PCT/JP2013/063284
§ 371 (c)(1),
(2) Date: Nov. 25, 2014

(87) PCT Pub. No.: WO2014/006976
PCT Pub. Date: Jan. 9, 2014

(65) Prior Publication Data
US 2015/0136938 A1    May 21, 2015

(30) Foreign Application Priority Data

Jul. 6, 2012 (JP) .................................. 2012-153031

(51) Int. Cl.
*B60N 2/00* (2006.01)
*F16F 15/08* (2006.01)
(Continued)

(52) U.S. Cl.
CPC ................ *B60N 2/542* (2013.01); *B60N 2/015* (2013.01); *B60N 2/0155* (2013.01); *B60N 2/01583* (2013.01); *B60N 2/0732* (2013.01); *B60N 2/502* (2013.01); *B60N 2/544* (2013.01)

(58) Field of Classification Search
CPC .......... B60N 2/50; B60N 2/502; B60N 2/542; B60N 2/015; B60N 2/0155; B60N 2/1583
USPC ............ 248/424, 429, 222.14, 560, 562, 566, 248/573, 580, 615, 638, 658; 297/451.3, 297/451.7, 285; 267/131, 133, 220
See application file for complete search history.

(56) References Cited

U.S. PATENT DOCUMENTS 3,917,342 A * 11/1975 Furuta ..................... B60R 22/26
                                                       248/429
5,395,089 A *  3/1995 Yamauchi .............. B60N 2/504
                                                       248/578

(Continued)

FOREIGN PATENT DOCUMENTS

CN       1113862 A    12/1995
CN     201472194 U     5/2010

(Continued)

OTHER PUBLICATIONS

International Search Report from International Application PCT/JP2013/063824 with a mailing date of Aug. 13, 2013.
(Continued)

*Primary Examiner* — Tan Le
(74) *Attorney, Agent, or Firm* — Carrier Blackman & Associates, P.C.; Joseph P. Carrier; William D. Blackman

(57) ABSTRACT

A supporting unit structure of a vehicle seat includes: a rubber elastic body; a seat-connected member; and a floor-connected member. An inner peripheral portion of the rubber elastic body is fastened to either one of the seat-connected member or the floor-connected member by a fastening member that penetrates the inner peripheral portion, and an outer peripheral portion of the rubber elastic body is fastened to the other one of the seat-connected member or the floor-connected member. The other one of the seat-connected member or the floor-connected member is provided with a stopper portion that abuts the fastening member in a radial direction of the fastening member when the seat-connected member and the floor-connected member are relatively displaced by more than a predetermined distance.

3 Claims, 5 Drawing Sheets

(51) Int. Cl.
*B60N 2/50* (2006.01)
*B60N 2/54* (2006.01)
*B60N 2/015* (2006.01)
*B60N 2/07* (2006.01)

(56) References Cited

U.S. PATENT DOCUMENTS

| | | | | |
|---|---|---|---|---|
| 8,733,725 | B2* | 5/2014 | Kimura | B60N 2/0232 |
| | | | | 248/429 |
| 2015/0130251 | A1* | 5/2015 | Kondo | B60N 2/542 |
| | | | | 297/451.3 |
| 2015/0136938 | A1* | 5/2015 | Kondo | B60N 2/502 |
| | | | | 248/573 |

FOREIGN PATENT DOCUMENTS

| | | |
|---|---|---|
| JP | S59140926 U | 9/1984 |
| JP | 60-020421 U | 2/1985 |
| JP | 2-106930 U | 8/1990 |
| JP | 3-7078 U | 1/1991 |
| JP | 3-34943 U | 4/1991 |
| JP | 08-058451 A | 3/1996 |
| JP | 2010-132178 A | 6/2010 |
| WO | 2008/117669 A1 | 10/2008 |

OTHER PUBLICATIONS

Office Action mailed Nov. 30, 2015 corresponding to Chinese Patent Application 201380029167.4.

* cited by examiner

SUPPORTING UNIT STRUCTURE OF VEHICLE SEAT

FIELD OF THE INVENTION

The present invention relates to a supporting unit structure of a vehicle seat Priority is claimed on Japanese Patent Application No. 2012-153031, filed Jul. 6, 2012, the content of which is incorporated herein by reference.

RELATED ART

Many vehicle seats are supported rigidly relative to the vehicle body floor. Vibrations of various frequencies are generated in the vehicle. Therefore, when a vibration having a frequency close to the natural frequency of the vehicle sheet is transmitted to the vehicle floor from an idling vibration of the engine or from driving vibration, it is likely to cause the vehicle seat to vibrate.

Therefore, as the supporting unit structure of the vehicle seat to deal with the vibration described above, a structure is known (for example, refer to Patent Document 1) in which a rubber elastic body is interposed between a floor-connected member and a seat-connected member.

In the supporting unit structure described in Patent Document 1, a cylinder body is connected with a supporting rod that is disposed inside the cylinder body by an annular rubber elastic body. One end in the axial direction of the supporting rod is attached to a seat frame (seat-connected member). The other end in the axial direction of the cylinder body is attached to a slide rail (floor-connected member). In addition, in this supporting unit structure, a fastening pin that extends along the radial direction of the cylinder body is attached to a supporting bar. A long hole is formed in the cylinder body. The fastening pin is inserted in the long hole. The fastening pin is adapted to abut the wall of the long hole when the supporting rod and the cylinder body are relatively displaced by more than a predetermined distance.

REFERENCE DOCUMENT

Patent Document

[Patent Document 1]: Japanese Unexamined Patent Application, First Publication No. 2010-132178

DISCLOSURE OF THE INVENTION

Problems to be Solved by the Invention

In the aforementioned conventional supporting unit structure, one end in the axial direction of the supporting rod is fixed to the seat-connected member. The other end in the axial direction of the cylinder body is fixed to the floor-connected member. A part in the axial direction of the cylinder body serves as a stopper portion (long hole) for restricting excessive relative displacement between the supporting rod and the cylinder body.

In this conventional supporting unit structure, the axial length of the rubber elastic body have to be long enough to ensure the vibration-restriction function. Thus, the axial length of the cylinder body and the supporting bar are longish, and occupy too much space in the seat height direction. Therefore, when this conventional supporting unit structure is adopted, the layout design of the seat could be limited.

The present invention has an object of providing a supporting unit structure of a vehicle seat that can restrain excessive displacement of a seat-connected member without increasing the occupied space in the seat height direction, while achieving an improvement of its anti-vibration function.

Methods for Solving the Problem

In order to solve the aforementioned problems, the supporting unit structure of a vehicle seat according to the present invention employs the following configuration.

(1) A supporting unit structure of a vehicle seat according to an aspect of the present invention includes: a rubber elastic body that is annular; a seat-connected member; and a floor-connected member, wherein: the seat-connected member is supported by the floor-connected member via the rubber elastic body; an inner peripheral portion of the rubber elastic body is fastened to either one of the seat-connected member or the floor-connected member by a fastening member that penetrates the inner peripheral portion, and an outer peripheral portion of the rubber elastic body is fastened to the other one of the seat-connected member or the floor-connected member; and the other one of the seat-connected member or the floor-connected member is provided with a stopper portion that abuts the fastening member in a radial direction of the fastening member when the seat-connected member and the floor-connected member are relatively displaced by more than a predetermined distance.

According to this configuration, the vibration that would be transmitted to the seat-connected member from the floor-connected member is absorbed by the rubber elastic body. In addition, it is possible to design the rubber elastic body so that the resonant frequency of the seat is out of the main frequency range of the vibration generated in the vehicle body. When the seat-connected member and the floor-connected member are relatively displaced by more than a predetermined distance by an input of impact load or the like, the fastening member abuts the stopper portion in the radial direction, and thereby excessive displacement of the seat-connected member is prevented.

(2) In the aspect described in (1) above, the other one of the seat-connected member or the floor-connected member may include a plate shaped member that has a through-hole; the fastening member may be disposed in the through-hole of the plate shaped member so that at least part of the fastening member overlaps with the plate shaped member in a thickness direction; and an inner wall of the through-hole may constitute the stopper portion.

According to this configuration, when the seat-connected member and the floor-connected member are relatively displaced by more than a predetermined distance, the fastening member abuts with the inner wall of the through-hole of the plate shaped member, and thereby excessive displacement of the seat-connected member is restricted. The load that is inputted from the fastening member to the inner wall of the through-hole is received by the plate shaped member as a load in the direction along the surface of the plate shaped member.

Effects of the Invention

According to an aspect described in aforementioned (1), it is possible to effectively prevent the vibration of the seat by way of the annular rubber elastic body that is interposed between the seat-connected member and the floor-connected member. Moreover, when the seat-connected member and the floor-connected member are relatively displaced by more than a predetermined distance, the fastening member abuts the stopper portion in the radial direction. Thus, it is possible to restrict excessive displacement of the seat-connected member without increasing the space occupied in the seat height direction.

According to an aspect described in (2) above, as the load that is inputted from the fastening member to the inner wall of the through-hole is received by the plate shaped member as a load in the direction along the plate surface of the plate shaped member, it is possible to stably restrict excessive displacement of the seat-connected member by the simple structure with only little increase in the volume and the weight.

EMBODIMENTS OF THE INVENTION

Figure 1:
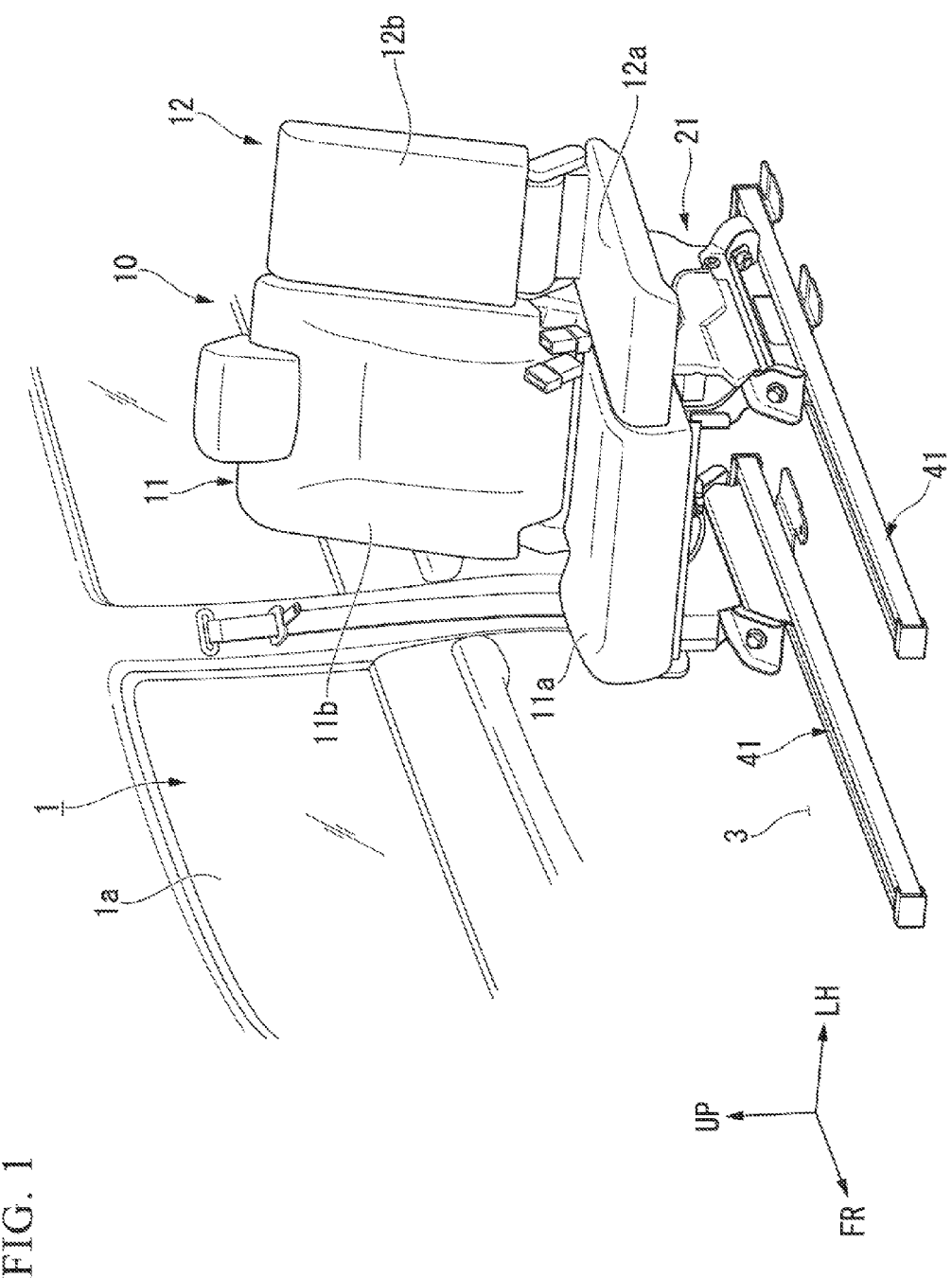
FIG. 1 is a perspective view showing a vehicle seat and a mounting portion of the seat according to an embodiment of the present invention.

Hereinbelow, an embodiment of the present invention will be described with reference to the drawings. In the drawings, the arrow FR refers to the front of the vehicle 1. The arrow UP refers to the upper direction of the vehicle 1. The arrow LH refers to the left direction of the vehicle 1. In the following description, unless otherwise stated in particular, the terms front, rear, above, below, left, and right are intended to mean front, rear, above, below, left, and right with respect to the vehicle 1, respectively.

Figure 2:
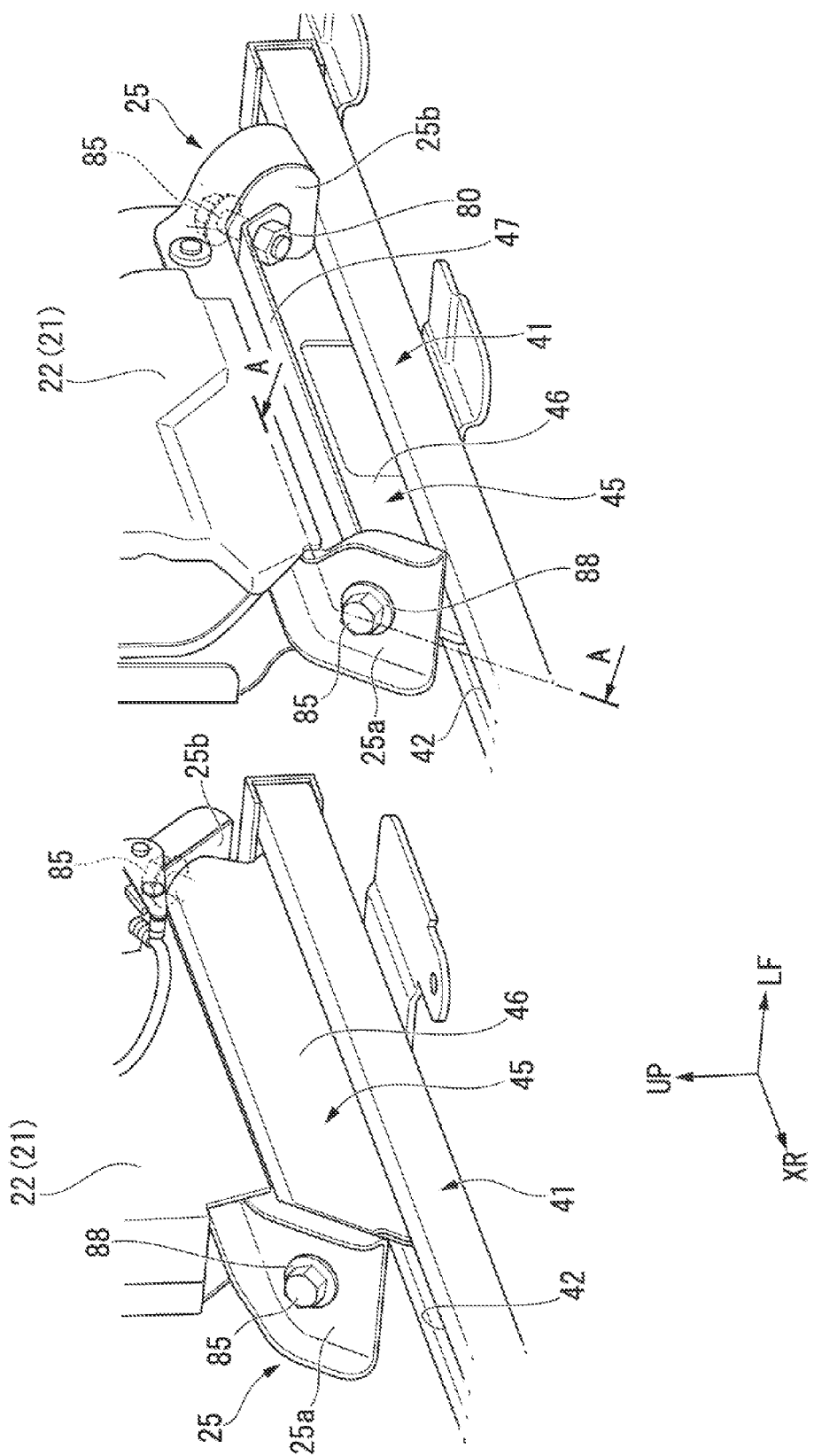
FIG. 2 is a diagram showing an enlarged part of FIG. 1.
Figure 3:
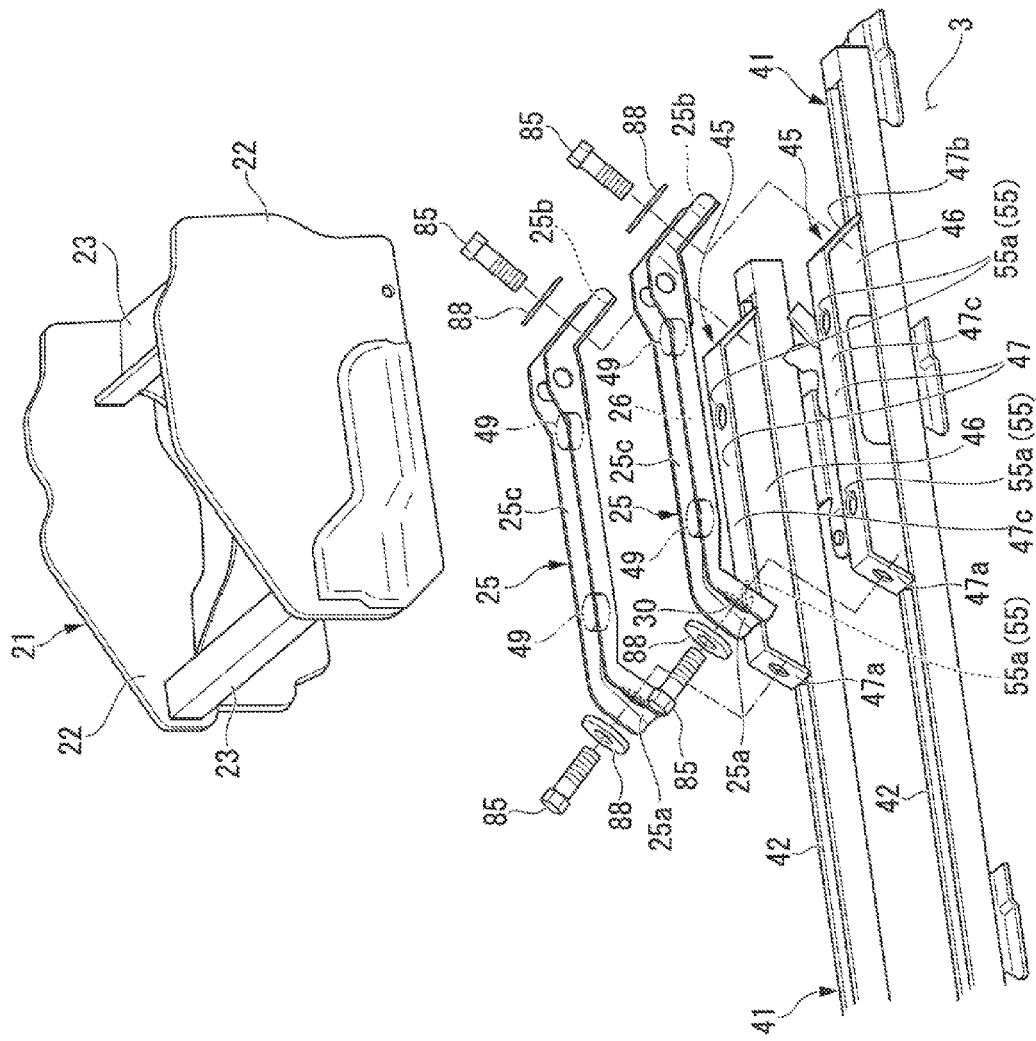
FIG. 3 is an exploded perspective view showing a vehicle seat and a mounting portion of the seat according to the embodiment of the present invention.

FIG. 1 is a diagram showing the vehicle seat 10 installed in the vehicle chamber 1a (hereinbelow, refer to "seat 10") and the mounting portion of the seat. The vehicle 1 in this embodiment is a minivan type vehicle having multiple rows of seats in the front-rear direction on the floor 3 in the vehicle chamber 1a. In FIG. 1, only the seat 10 in the second row is shown. FIG. 2 is a diagram showing an enlarged part of FIG. 1. FIG. 3 is an exploded perspective view showing the seat 10 and the mounting portion of the seat 10.

The small center seat part 12 is integrally connected to the left side of the right seat section 11 of the seat 10. In the right seat part 11 and the center seat part 12, the seat back 11b, seat back 12b are tiltably connected to the rear portions of the seat cushion 11a, seat cushion 12a, respectively. The seat cushion 11 and the seat cushion 12a support the thighs and buttocks of the occupant. The seat back 11b and the seat back 12b support the waist back and back of the occupant.

As shown in FIG. 3, the right seat part 11 is provided with a seat base 21 (seat-connected member) that constitutes the framework part of the lower part of the seat cushion 11a. The seat base 21 is provided with a pair of side wall blocks 22 at both side portions in the vehicle width direction. The front end portions of the side wall blocks 22 and 22 are joined by a cross beam member 23, and the rear end portions of the side wall blocks 22 and 22 are joined by another cross beam member 23. The center seat part 12 is supported on the floor 3 in the vehicle chamber 1a through the seat base 21 of the right seat part 11.

On the floor 3 of the vehicle chamber 1a, a pair of the seat rails 41, 41 are fixedly mounted along the front-rear direction of the vehicle body. As shown in FIGS. 2 and 3, each of the seat rails 41 is disposed at a position corresponding to the lower position of each of the left and right side wall blocks 22 and 22 of the seat base 21. A guide groove 42 that opens upward along the front-rear direction of the vehicle body is formed in each seat rail 41. In the guide groove 42, the slide adjuster 45 is slidably mounted in the front-rear direction. The slide adjuster 45 is mounted in a manner it cannot be removed vertically.

The slide adjuster 45 includes an adjuster body portion (not shown) and the pedestal portion 46. The adjuster body portions are disposed inside the corresponding seat rail 41. Adjuster body portion is slidably fastened to the inside of the seat rail 41. The pedestal portion 46 protrudes above the seat rails 41 through the guide groove 42 from the adjuster body portion. In addition, although a detailed description is omitted here, between the adjuster body portion and the corresponding seat rail 41, a slide lock mechanism that is not shown in the drawing is provided for locking the front and rear operating positions of the seat 10.

As shown in FIG. 3, the pedestal portion 46 of the slide adjuster 45 includes a top plate 47 (the floor-connected member, the plate shaped member) that extends in the front-rear direction of the vehicle body. The top plate 47 is constituted with a plate shaped member made of metal. The base portion 47c that is provided at the center in the front-rear direction of the top plate 47 extends horizontally along the front-rear direction of the vehicle body. The mount portions 47a, 47b are provided respectively at the front and rear of the base portion 47c. The mount portions 47a, 47b extend while bending obliquely downward.

Figure 4:
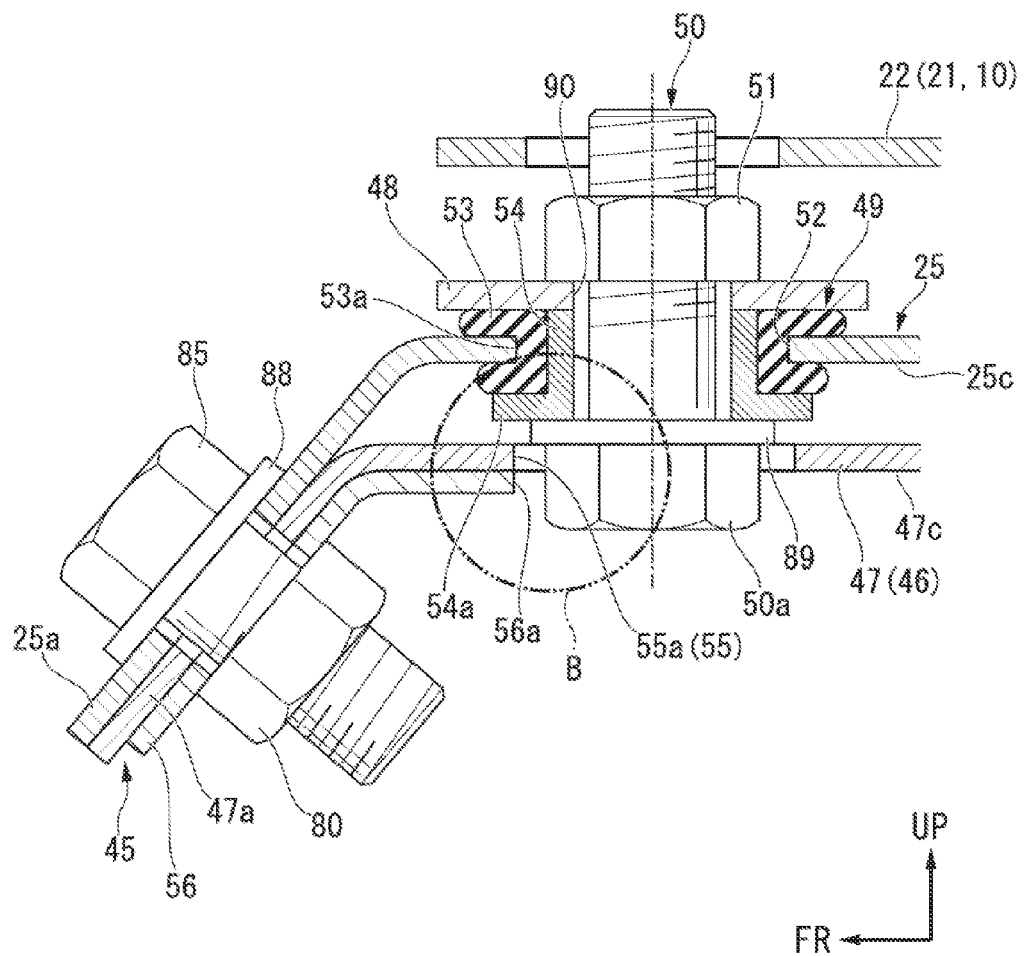
FIG. 4 is a sectional view of the mounting portion of the vehicle seat according to the embodiment of the present invention, corresponding to the A-A cross-section of FIG. 2.

FIG. 4, 5 show the cross-sections of the mounting portions (the side wall blocks 22) of the seat 10.

Figure 5:
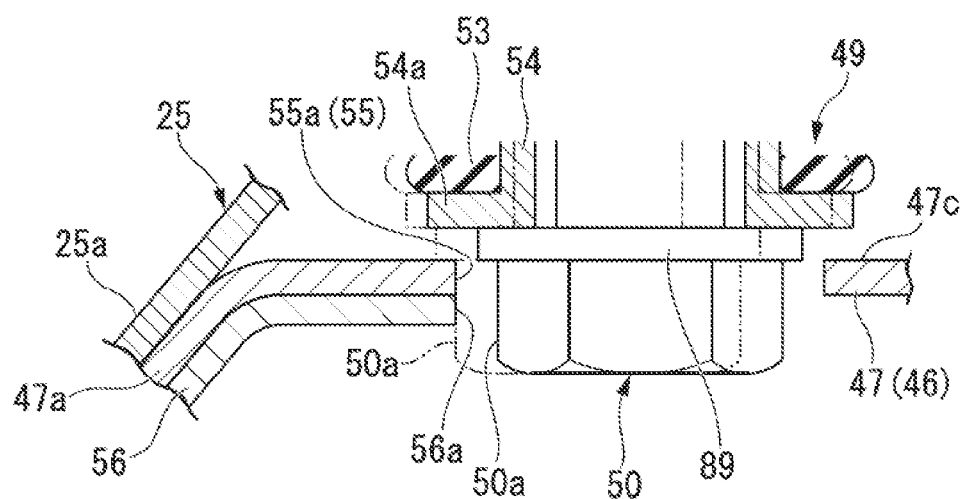
FIG. 5 is an enlarged sectional view corresponding to part B of FIG. 4.

As shown in FIGS. 4, 5, a supporting bracket 25 (the floor-connected member) are mounted on the top part of the top plate 47 of each slide adjuster 45. Each of the supporting brackets 25 supports the lower end of each of the side wall blocks 22 of the seat base 21. The supporting brackets 25 includes a plate shaped member that is made of metal similar to the top plate 47. Base portions 25c that are provided at the center in the front-rear direction of the supporting brackets 25 extend horizontally along the front-rear direction of the vehicle body. Each of the supporting brackets 25 is provided with a front edge portion 25a and a rear edge portion 25b that are bend and extend obliquely downward at the front and rear ends of the base portion 25c. In a side view from the vehicle width direction, the supporting brackets 25 has an arch shape which is bent in a substantially trapezoidal shape. In each of the supporting brackets 25, the front edge portion 25a and rear edge portion 25b are fastened to corresponding mount portions 47a, 47b at the front and rear ends of the top plate 47 by bolts 85 and nuts 80.

Thus, the supporting brackets 25 are fastened to the top plates 47. When they are fastened, as shown in FIG. 4, the base portions 25c provided at the center in the front-rear direction of the supporting brackets 25 is spaced by a predetermined distance upward with respect to the base portion 47c of the top plate 47. Reference symbol 88 in the drawing represents a washer that is fastened to the bearing surface of the bolt 85.

In addition, as shown in FIGS. 2, 3, each supporting bracket 25 is formed in a substantially horseshoe shape opening upward in a sideway-cross-section (a cross section taken along the vehicle width direction), in order to increase the strength and the rigidity.

As shown in FIG. 4, the seat bracket 48 (the seat-connected member) that is constituted with a plate shaped member made of metal is integrally attached at a front and rear portions on the lower surface of each of the left and right side wall blocks 22 of the seat base 21. FIG. 4 shows the structure of the mounting portion at the front portion of the side wall blocks 22 of the seat base 21. The mounting portion at the rear portion of the side wall blocks 22 has a similar structure.

The left and right side wall blocks 22, 22 of the seat base 21 are placed over the top of the corresponding left and right supporting brackets 25 with the seat brackets 48 in between. Then, the left and right side wall blocks 22, 22 of the seat base 21 are fastened to the corresponding slide adjusters 45 with a bolt 50 (a fastening member) and a nut 51 (a fastening member), with the vibration isolating blocks 49 in-between. The vibration isolating blocks 49 will be described later.

In this embodiment, the seat bracket 48 and the seat base 21 constitute the seat-connected member, and the supporting bracket 25 and the top plate 47 constitute the floor-connected member.

The nut 51 for fixing the side wall block 22 to the slide adjuster 45 is welded and fixed to the upper surface of the seat bracket 48. The bolt 50 that is screwed into the nut 51 is adapted to be tightened from the lower surface of the supporting bracket 25. The reference symbol 89 in FIG. 4 represents a washer that is fastened at the head of the bolt 50. The reference symbol 90 in FIG. 4 represents a bolt-insertion-hole of the seat bracket 48 in which the shaft portion of the bolt 50 is inserted.

As shown in FIG. 4, a mounting-hole 52 is formed at the portion on the supporting bracket 25 where the bolt 50 is to be inserted. The mounting-hole 52 is larger than the outer diameter of the shaft portion of the bolt 50. The annular vibration isolating block 49 described above is mounted at the mounting-hole 52

The vibration isolating block 49 includes a rubber elastic body 53 and a collar 54 made of metal. The rubber elastic body 53 is annular. The metal collar 54 made of metal is fitted into the inner periphery of the rubber elastic body 53. An annular locking groove 53a is formed on the outer peripheral surface of the rubber elastic body 53. The edge portion of the mounting-hole 52 of the supporting bracket 25 is adapted to be fitted in the locking groove 53a. The collar 54 that is fitted to the inner periphery of the rubber elastic body 53 is provided with a flange portion 54a at one end in the axial direction. The vibration isolating block 49 is assembled by fitting the collar 54 into the rubber elastic body 53. The tip of the bolt 50 is inserted into the inner periphery of the collar 54. Then, the tip of the bolt 50 is screwed into the nut 51, and thereby the vibration isolating block 49 is fixedly fastened to the seat bracket 48. At this time, the flange portion 54a at one end of the collar 54 abuts the washer 89 on the side of the head portion 50a of the bolt 50. On the other hand, the other end of the collar 54 directly abuts with the edge portion of the bolt insertion hole 90 of the seat bracket 48.

In addition, when the vibration isolating block 49 is fixedly fastened to the seat bracket 48 as described above, the rubber elastic body 53 compressively deforms in the axial direction, and the edge portions on both sides of the locking groove 53a is pressed against the peripheral edge portion of the mounting-hole 52 of the supporting bracket 25.

At a part of the base portion 47c of the top plate 47 positioned directly below the mounting-hole 52 formed on the supporting bracket 25, a through-hole 55 having an inner diameter larger than the head portion 50a of the bolt 50 is formed. When the vibration isolating block 49 is mounted on the seat bracket 48 and the supporting bracket 25 as described above, the inner wall 55a (the stopper portion) of the through-hole 55 faces the outer peripheral surface of the head portion 50a of the bolt 50, with a predetermined gap. In other words, in the through-hole 55, the head portion 50a of the bolt 50 overlaps with the top plate 47 in the thickness direction.

As shown in FIG. 5, when the seat bracket 48 is relatively displaced by more than a predetermined distance in a substantially horizontal direction with respect to the supporting bracket 25 and the top plate 47, the inner wall 55a of the through-hole 55 of the top plate 47 abuts the outer peripheral surface of the head portion 50a of the bolt 50. As a result, excessive displacement in a substantially horizontal direction of the seat 10 is restrained. In other words, in this embodiment, the inner wall 55a of the through-hole 55 constitutes the stopper portion.

In addition, reference symbol 56 in FIG. 4 represents a reinforcing plate which is bonded onto part of the top plate 47 on its back surface from the mount portion 47a to part of the base portion 47c. In this embodiment, the end portion 56a of the reinforcing plate 56 at the side of the base portion 47c is formed in a shape that matches the arc of the through-hole 55 of the base portion 47c. When the head portion 50a of the bolt 50 is displaced by more than a predetermined distance, the head portion 50a of the bolt 50 abuts the inner wall 55a of the through-hole 55 and also with the end portion 56a of the reinforcing plate 56. Therefore, in this embodiment, the end portion 56a of the reinforcing plate 56 also constitutes a part of the stopper portion.

In the supporting unit structure of the seat 10 of this embodiment, the vibration isolating block 49 (the rubber elastic body 53) is specifically configured to reduce vibration of the following categories (1) and (2) in particular, among the vibrations transmitted to the seat 10 parts from the vehicle body.

(1) the idling vibration of the engine (the vibration in the frequency range of 20 to 25 Hz)

(2) the traveling vibration (the vibration in the frequency range of 15 to 20 Hz)

Specifically, the vibration isolating block 49 (the rubber elastic body 53) is configured so that the resonant frequency range of the seat 10 becomes lower than the vibration frequency range of the above (1), (2). The value of the vibration frequency range are shown here as an example. It is possible to configure the constitution to be suitable for other vibration frequency ranges.

In the supporting unit structure of the seat 10, when vibrations in the range of the above (1) or (2) occur, since the resonant frequency of the seat 10 is offset to a lower frequency than the frequency range of these vibrations by virtue of the vibration isolating block 49 (the rubber elastic body 53), it is possible to effectively prevent the vibration of the seat 10.

In the supporting unit structure of the seat 10, the rubber elastic body 53 is interposed between the supporting bracket 25 that is the floor-connected member and the seat bracket 48 that is a seat-connected member. Therefore, when a large impact load is input to the vehicle, the seat 10 may be displaced with respect to the floor 3. In this situation, when the seat bracket 18 is displaced by more than a predetermined distance in a substantially horizontal direction with respect to the supporting bracket 25, the head portion 50a of the bolt 50 that fastens the inner peripheral portion of the rubber elastic, body 53 against the seat bracket 48 side abuts in the radial direction with the inner wall 55a of the through-hole 55 of the top plate 47 that is a seat-connected member. Therefore, excessive displacement of the seat 10 is restrained by the abutment of the bolt 50 and the inner wall 55a.

In the supporting unit structure of the seat 10, the head portion 50a of the bolt 50 that protrudes downward from the end portion in the axial direction of the vibration isolating block 49 abuts the inner wall 55a of the through-hole 55 of the top plate 47. By this function, excessive displacement of the seat 10 is restricted. This structure for restricting displacement of the seat 10 does not occupy a large space in the height direction of the seat 10.

Therefore, it is possible to increase the degree of freedom of the seat layout by adopting this supporting unit structure of the seat 10.

In addition, in the supporting unit structure of the seat 10, the head portion 50a of the bolt 50 that protrudes downward from the end portion in the axial direction of the vibration isolating block 49 is disposed so as to overlap in the thickness direction of the top plate 47 inside the through-hole 55 of the top plate 47. Thus, the inner wall 55a of the through-hole 55 is configured to function as the stopper portion. Therefore, in spite of the simple structure with little increase in the volume increase and the weight increase, excessive displacement of the seat 10 can be reliably restricted. In other words, in this supporting unit structure, a load that is input from the head portion 50a of the bolt 50 to the inner wall 55a of the through-hole 55 can be received in the direction along the surface direction of the base portion 47c of the top plate 47. Therefore, it is possible to restrain excessive displacement of the seat 10 without adding another stopper member to the seat-connected member such as the top plate 47.

The present invention is not intended to be limited to the embodiments described above. Design changes from the embodiments may be made without departing from the scope of the invention. Although in the above description, the embodiment of the present invention has been described using an example of second-row seats of the vehicle, the supporting unit structure may be adopted for the seat of the third or fourth row of the vehicle.

In addition, in the embodiment described above, the inner peripheral portion of the rubber elastic body 53 is fastened to the seat bracket 48 that is the seat-connected member by the bolt 50, and the outer peripheral portion of the rubber elastic body 53 is fastened to the supporting bracket 25 that is the floor-connected member. However, the opposite configuration may also be adopted, in which the inner peripheral portion of the rubber elastic body 53 is fastened to the floor-connected member, and the outer peripheral portion of the rubber elastic body 53 is fastened to the seat-connected member.

REFERENCE SYMBOL LIST

10: seat
21: seat base (seat-connected member)
25: supporting bracket (floor-connected member)
47: top plate (floor-connected member, plate shaped member)
48: seat bracket (seat-connected member)
50: bolt (fastening member)
51: nut (fastening member)
53: rubber elastic body
55: through-hole
55a: inner wall (stopper portion)

The invention claimed is:

1. A supporting unit structure of a vehicle seat comprising:
   a rubber elastic body that is annular;
   a seat-connected member; and
   a floor-connected member,
   wherein: the seat-connected member is supported by the floor-connected member via the rubber elastic body;
   an inner peripheral portion of the rubber elastic body is fastened to either one of the seat-connected member or the floor-connected member by a nut and a bolt that penetrates the inner peripheral portion and which is screwed into the nut, and an outer peripheral portion of the rubber elastic body is fastened to a first other one of the seat-connected member or the floor-connected member;
   a second other one of the seat-connected member or the floor-connected member comprises a plate shaped member that has a through-hole;
   a head of the bolt or the nut is disposed in the through-hole of the plate shaped member so that at least part of the head of the bolt or the nut overlaps with the plate shaped member in a thickness direction; and
   an inner wall of the through-hole constitutes a stopper portion that abuts the head of the bolt or the nut in a radial direction when the seat-connected member and the floor-connected member are relatively displaced by more than a predetermined distance.

2. The supporting unit structure of a vehicle seat according to claim 1, wherein:
   the second other one of the seat-connected member or the floor-connected member comprises a reinforcing plate that is bonded onto the plate shaped member; and
   an end portion of the reinforcing plate is formed in a shape that matches an arc of the through-hole, and the end portion of the reinforcing plate abuts the head of the bolt or the nut in the radial direction with the inner wall of the through-hole when the seat-connected member and the floor-connected member are relatively displaced by more than the predetermined distance.

3. The supporting unit structure of a vehicle seat according to claim 1, wherein an outer circumference of the head of the bolt or the nut is smaller than an inner circumference of the inner wall of the through-hole such that there is a gap between the head of the bolt or the nut and the through-hole.

* * * * *